United States Patent
Sauter

(10) Patent No.: US 6,893,380 B2
(45) Date of Patent: May 17, 2005

(54) TRACTION CONTROL SYSTEM INCLUDING CONVERTER PROTECTION FUNCTION

(75) Inventor: Thomas Sauter, Remseck (DE)

(73) Assignee: Robert Bosch GmbH, Stuttgart (DE)

(*) Notice: Subject to any disclaimer, the term of this patent is extended or adjusted under 35 U.S.C. 154(b) by 87 days.

(21) Appl. No.: 10/400,091

(22) Filed: Mar. 25, 2003

(65) Prior Publication Data

US 2004/0029682 A1 Feb. 12, 2004

(30) Foreign Application Priority Data

Mar. 26, 2002 (DE) .......................................... 102 13 387
Aug. 21, 2002 (DE) .......................................... 102 38 220

(51) Int. Cl.$^7$ .............................................. B60K 41/20
(52) U.S. Cl. .......................................... 477/183; 701/73
(58) Field of Search .............................. 701/51, 54, 65, 701/67, 70, 71, 73, 74–75, 78, 80, 82–88, 90–91, 99, 104, 110; 477/34, 62, 70–74, 77–79, 83, 90, 92, 115, 166, 170–177, 183, 203, 205–207

(56) References Cited

U.S. PATENT DOCUMENTS 5,045,035 A  *  9/1991  Ganoung ..................... 475/42

FOREIGN PATENT DOCUMENTS

| EP | 0 656 275 | 6/1999 |
| EP | 1 253 355 | 10/2002 |

\* cited by examiner

*Primary Examiner*—Thu V. Nguyen
(74) *Attorney, Agent, or Firm*—Kenyon & Kenyon

(57) ABSTRACT

A method and a device for protecting a torque converter of an automatic transmission from overheating during standing-start of a motor vehicle, a slipping wheel being decelerated by a traction control system by a braking intervention. To improve the protective function of the traction control system, the energy loss converted in the torque converter or a value proportional to it is calculated and the engine torque is reduced if a specified threshold value is exceeded.

14 Claims, 1 Drawing Sheet

TRACTION CONTROL SYSTEM INCLUDING CONVERTER PROTECTION FUNCTION

FIELD OF THE INVENTION

The present invention relates to a method for protecting a torque converter from overheating and a traction control system including a converter protection function.

BACKGROUND INFORMATION

When starting off on a road surface having different adhesive friction values between the right and left sides of the vehicle ($\mu$-split), even when a relatively slight drive torque is applied, the wheel (low-$\mu$ wheel) located on the slippery side of the road surface begins to spin. If the speed of the low-$\mu$ wheel exceeds a specific slip threshold, the traction control system (TCS) intervenes in the operation of the vehicle and brakes the slipping wheel.

The braking torque exerted on the low-$\mu$ wheel is transferred via the differential to the wheel on the non-skid side of the road surface (high-$\mu$ wheel) and may be used there for the propulsion of the vehicle.

With a regulation of this type, the brake intervention on the slipping wheel converts the engine torque in the brake into heat. In vehicles with automatic transmission, this also has the consequence that the engine torque produced (less the torque acting in the brake) is converted into thermal energy in the torque converter of the automatic transmission, which may destroy the torque converter or the transmission even after a relatively short time.

During standing-start operations under $\mu$-split conditions, situations may arise in particular with heavily loaded vehicles or vehicles with trailers in which the vehicle does not begin to move despite maximum drive torque, since the braking resistance torque and rolling resistance torque of the vehicle and the downgrade force acting on the vehicle and trailer are greater than the engine torque produced by the engine. In such situations, the result is an extreme load and a correspondingly rapid overheating of the torque converter.

Other traction control systems therefore include a converter or transmission protection function, which is implemented using a time counter, which is started in the control state "select high" when starting off on $\mu$-split and below a vehicle speed of 5 km/h and which causes a forced switch into the state "select low" after a specified period of time (e.g., 15 seconds).

The state "select high" of a TCS is used to attain the maximum possible traction and is characterized by high slip thresholds for the drive wheels and a relatively high delivery of engine torque. In contrast, the state "select low" is used to attain the maximum possible vehicle stability and is characterized by slip thresholds set to be very sensitive and a correspondingly low engine torque.

The protective function of other systems provide that the TCS performs a rigid (time-controlled) switch independent of the actual load on the torque converter. Thus the speed of a vehicle moving slowly forward with slipping drive wheels may be limited just before reaching a non-skid road surface, although the temperature reached in the torque converter would not have required this yet.

SUMMARY OF THE INVENTION

The present invention provides a converter protection function for a traction control system to the effect that the engine torque is reduced when it is actually necessary to protect the converter.

DETAILED DESCRIPTION

Figure 1:
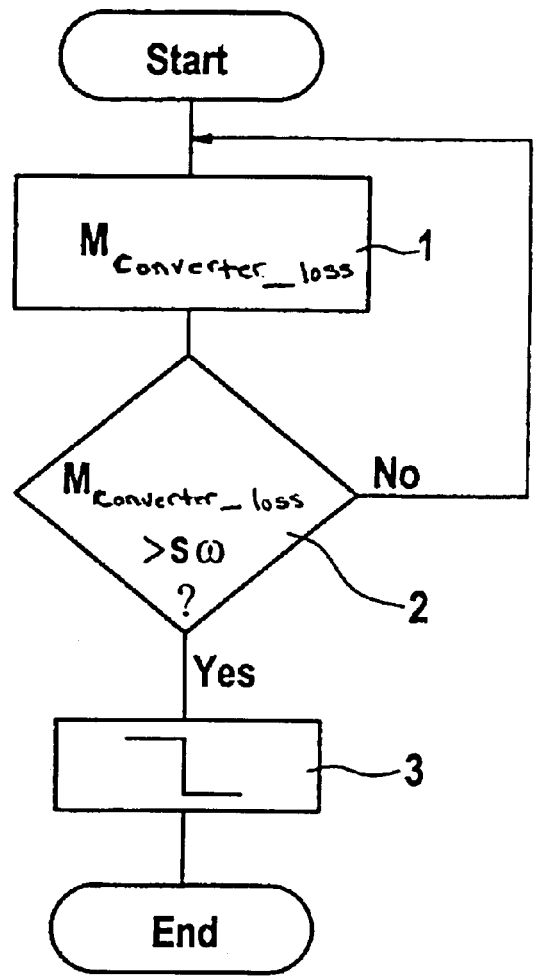
FIG. 1 shows a flow chart to explain a method for protecting a torque converter from overheating according to one exemplary embodiment of the present invention.

The sequence of a method for protecting a torque converter from overheating is shown in FIG. 1 in the form of a flow chart. In a first step 1, the energy loss $M_{CONVERTER\_LOSS}$ or a value proportional to it is calculated and this value is compared with a specified threshold value in Step 2.

If the energy loss converted in the torque converter is greater than threshold value sw, the engine torque is reduced in step 3, otherwise the current engine torque is maintained.

Figure 2:
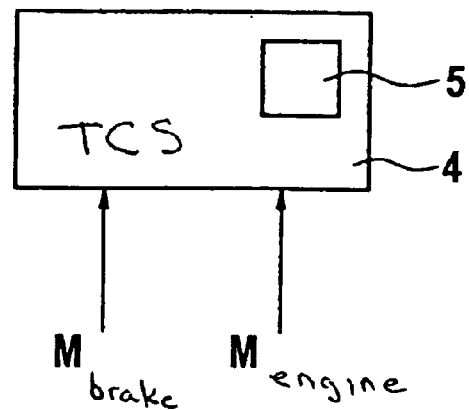
FIG. 2 shows a schematic representation of a traction control system.

FIG. 2 shows a traction control system 4 including a device 5 for determining the energy loss converted in the torque converter or a value proportional to it. The current braking torque $M_{BRAKE}$ and the current engine torque $M_{ENGINE}$ are supplied to traction control system 4. As was described above, engine torque $M_{ENGINE}$ is reduced if the converter energy loss or the proportional value exceeds a specified threshold value.

In particular, an exemplary embodiment includes calculating the energy loss converted in the torque converter or a value proportional to it and reduce the engine torque if the energy loss or the proportional value exceeds a specified threshold value. The energy loss or the proportional value represents a measure of the temperature prevailing in the torque converter, which is accordingly only reduced if the converter temperature requires it.

Also, according to an exemplary embodiment, a torque balance is performed relative to the propulsion and deceleration moments acting on the vehicle, from which a converter torque loss is determined. The converter torque loss is integrated over time and thus forms a reference value, which is a measure of the energy dissipation converted in the torque converter and accordingly the converter temperature.

In calculating the energy loss converted in the torque converter or the proportional value, the heat dissipation of the torque converter may be taken into consideration.

The TCS, which is in the state "select high" at the beginning of the starting-off operation, may switch to the state "select low" if the energy loss converted in the torque converter or the value proportional to it exceeds the specified threshold value.

During standing-start under $\mu$-split conditions, a wheel located on the slippery side of the road surface begins to slip due to the engine torque applied by the driver. The TCS recognizes this and regulates an appropriate brake pressure on the low-$\mu$ wheel. Since the vehicle does not drive off, the engine torque delivered is converted into heat in the torque converter and in the brake and into acceleration in the drive train. The following relationship applies:

$$M_{ENGINE} = M_{BRAKE} + M_{CONVERTER\_LOSS} + M_{WBR}, \text{ where}$$

$M_{ENGINE}$: engine torque produced
$M_{BRAKE}$: braking torque converted in the brake
$M_{CONVERTER\_LOSS}$: torque loss which heats the converter
$M_{WBR}$: rotational acceleration resistance torque of the drive train The acceleration of the drive train lasts for only a short period of time. Afterwards, a steady state prevails, i.e., the angular acceleration is equal to zero as is the rotational acceleration resistance torque $M_{WBR}$ as well. In the steady state, the following equation applies to the torque loss of the converter $M_{CONVERTER\_LOSS}$:

$$M_{CONVERTER\_LOSS} = M_{ENGINE} - M_{BRAKE}$$

For the brake pressure $P_{BRAKE}$ delivered by the TCS, the following applies:

$$M_{BRAKE} = P_{BRAKE} * C,$$

C being a conversion constant (Nm/bar).

Taking into consideration the rotational acceleration resistance torque $M_{WBR}$ of the drive train, the following applies:

$$M_{WBR} = M_{WBR\_ENGINE} + M_{WBR\_DRIVETRAIN} \text{ with}$$

$$M_{WBR} = J_{ENGINE} * \omega_{ENGINE} + J_{DRIVETRAIN} * \omega_{DRIVETRAIN}, \text{ where}$$

J: mass moment of inertia [kgm²]
ω: angular acceleration [1/s²]

Both the engine speed and the wheel speeds are known as are the individual mass moments of inertia J of the drive train.

To determine the energy loss converted in the converter, the converter torque loss $M_{CONVERTER\_LOSS}$ is integrated over time. In doing so, the energy dissipation, through convection and thermal radiation in particular, which causes a reduction in temperature, may also be considered. With iterative calculation (index t), the following applies:

$$M_{CONVERTER\_LIMIT} = M_{CONVERTER\_LIMIT(t-1)} + dM_{CONVERTER\_LOSS} * dt - dM_{CONVECTION} * dt \text{ where}$$

$dM_{CONVECTION}$: application parameter.

If converter limit torque $M_{CONVERTER\_LIMIT}$, which is specified as the threshold value, is exceeded the operating state of the TCS is switched from "select high" to "select low," i.e., the engine regulates very sensitively.

According to another exemplary embodiment, a temperature model may be used to determine the temperature of the torque converter. The temperature model is a computer model which describes the thermal characteristics of the torque converter under different propulsion and braking conditions. As an input variable, the temperature model includes, for example, the converter torque loss and may also take the heat dissipation into consideration.

The TCS may switch from "select high" to "select low" if the temperature determined by the temperature model exceeds a specified threshold value.

What is claimed is:

1. A method for protecting a torque converter of an automatic transmission of a vehicle from overheating during a traction control operation, the method comprising:
   calculating one of an energy loss converted in the torque converter and a value proportional to the energy loss converted in the torque converter;
   reducing an engine torque when one of the energy loss converted in the torque converter and the value proportional to the energy loss converted in the torque converter exceeds a threshold value; and
   performing an engine torque balance relative to a propulsion and deceleration moments acting on the vehicle, and determining a converter torque loss therefrom.

2. The method of claim 1, wherein the converter torque loss is integrated over time.

3. The method of claim 1, wherein, in calculating the one of the energy loss converted in the torque converter and the value proportional to the energy loss converted, a heat dissipation of the torque converter is considered.

4. The method of claim 1, wherein the traction control system switches from a select high state to a select low state when the one of the energy loss converted in the torque converter and the value proportional to the energy loss converted in the torque converter exceeds the threshold value.

5. The method of claim 1, wherein the converter torque loss is integrated over time, and wherein, in calculating the one of the energy loss converted in the torque converter and the value proportional to the energy loss converted, a heat dissipation of the torque converter is considered.

6. The method of claim 1, wherein, in calculating the one of the energy loss converted in the torque converter and the value proportional to the energy loss converted, a heat dissipation of the torque converter is considered, and wherein the traction control system switches from a select high state to a select low state when the one of the energy loss converted in the torque converter and the value proportional to the energy loss converted in the torque converter exceeds the threshold value.

7. The method of claim 6, wherein the converter torque loss is integrated over time.

8. A traction control system for protecting a torque converter of an automatic transmission from overheating during a traction control operation, comprising:
   a device to determine one of an energy loss converted in the torque converter and a value proportional to the energy loss converted in the torque converter; and
   an arrangement to reduce an engine torque when the energy loss converted in the torque converter and the value proportional to the energy loss converted in the torque converted exceeds a threshold value, and to perform an engine torque balance relative to a propulsion and deceleration moments acting on the vehicle, and determining a converter torque loss therefrom.

9. The system of claim 8, wherein the converter torque loss is integrated over time.

10. The system of claim 8, wherein, in calculating the one of the energy loss converted in the torque converter and the value proportional to the energy loss converted, a heat dissipation of the torque converter is considered.

11. The system of claim 8, wherein the traction control system switches from a select high state to a select low state when the one of the energy loss converted in the torque converter and the value proportional to the energy loss converted in the torque converter exceeds the threshold value.

12. The system of claim 8, wherein the converter torque loss is integrated over time, and wherein, in calculating the one of the energy loss converted in the torque converter and the value proportional to the energy loss converted, a heat dissipation of the torque converter is considered.

13. The system of claim 8, wherein, in calculating the one of the energy loss converted in the torque converter and the value proportional to the energy loss converted, a heat dissipation of the torque converter is considered, and wherein the traction control system switches from a select high state to a select low state when the one of the energy loss converted in the torque converter and the value proportional to the energy loss converted in the torque converter exceeds the threshold value.

14. The system of claim 13, wherein the converter torque loss is integrated over time.

* * * * *